US012715293B2

(12) United States Patent
Cha et al.

(10) Patent No.: US 12,715,293 B2
(45) Date of Patent: Aug. 25, 2026

(54) IN-VEHICLE VIDEO SYSTEM AND CONTROL METHOD THEREOF

(71) Applicants: Hyundai Motor Company, Seoul (KR); Kia Corporation, Seoul (KR)

(72) Inventors: Dong Eun Cha, Hwaseong-Si (KR); Yun Jee Lee, Seoul (KR); Dae Hee Lee, Incheon (KR); Jin Ho Hwang, Cheonan-Si (KR); Ji Hyun Song, Suwon-Si (KR); Sang heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 369 days.

(21) Appl. No.: 18/219,533

(22) Filed: Jul. 7, 2023

(65) Prior Publication Data

US 2024/0283995 A1 Aug. 22, 2024

(30) Foreign Application Priority Data

Feb. 20, 2023 (KR) ........................ 10-2023-0022327

(51) Int. Cl.
*H04N 21/414* (2011.01)
*B60K 35/60* (2024.01)
(Continued)

(52) U.S. Cl.
CPC ....... *B60K 35/60* (2024.01); *H04N 21/41422* (2013.01); *B60K 35/22* (2024.01);
(Continued)

(58) Field of Classification Search
CPC .. H04N 21/41422; B60K 35/00; B60K 35/81; B60K 2360/77; B60K 35/53; B60K 35/60; B60K 35/22
(Continued)

(56) References Cited

U.S. PATENT DOCUMENTS 11,006,163 B2 5/2021 Hasegawa et al.
2020/0189418 A1* 6/2020 Sailer ..................... B60N 2/062
(Continued)

FOREIGN PATENT DOCUMENTS

CN 114238857 A * 3/2022 ............ G06F 17/18
JP 6965454 11/2021
WO WO2020/143015 7/2020

*Primary Examiner* — Sath V Perungavoor
*Assistant Examiner* — Kristin Dobbs
(74) *Attorney, Agent, or Firm* — MORGAN, LEWIS & BOCKIUS LLP

(57) ABSTRACT

An in-vehicle video system and control method thereof, includes a display provided on an internal surface of a vehicle and configured to display a screen by receiving a video signal, a transfer unit provided on an internal side of the display with respect to the vehicle and configured to slide along a fixing member fixed to a floor of the vehicle on a frontward and rearward direction or a left and right direction of the vehicle within the vehicle, and a controller configured to determine a movement direction and a movement position of the transfer unit sliding in the frontward and rearward direction or the left and right direction and control the display and the transfer unit to transition the screen of the display in accordance with a movement path of the transfer unit based on the movement direction and the movement position of the transfer unit.

19 Claims, 7 Drawing Sheets

(51) Int. Cl.
*B60K 35/22* (2024.01)
*B60K 35/53* (2024.01)
*B60K 35/81* (2024.01)

(52) U.S. Cl.
CPC .............. *B60K 35/53* (2024.01); *B60K 35/81* (2024.01); *B60K 2360/77* (2024.01)

(58) Field of Classification Search
USPC .......................................................... 348/837
See application file for complete search history.

(56) References Cited

U.S. PATENT DOCUMENTS

2022/0292573 A1 9/2022 Ferguson et al.
2022/0371611 A1 11/2022 Yamanouchi et al.
2023/0089575 A1* 3/2023 Szczerba ................ H04N 5/645 348/837

* cited by examiner

FIG. 1 in-vehicle video system (100)

display (110)

transfer unit (120)

controller (130)

IN-VEHICLE VIDEO SYSTEM AND CONTROL METHOD THEREOF

CROSS REFERENCE TO RELATED APPLICATION

The present application claims priority to Korean Patent Application No. 10-2023-0022327, filed Feb. 20, 2023, the entire contents of which is incorporated herein for all purposes by this reference.

BACKGROUND OF THE PRESENT DISCLOSURE

Field of the Present Disclosure

The present disclosure relates to an in-vehicle video system and control method thereof, and more particularly, to an in-vehicle video system and control method thereof which is capable of three-dimensional space transitions by configuring a transfer unit sliding frontward and rearward or left and right within the interior of the vehicle which is lined with display screens.

Description of Related Art

Generally, a method of using a network system is for providing entertainment services through an image video device in a space of an autonomous vehicle in such a way as to transfer a user to a location for entertainment services via an electronical authentication means and for providing, on a display, corresponding information based on the data received through a server of the entertainment service provider.

With recent advancements in vehicle technology, there is an increasing development of purpose-built vehicles that support various services in mobility. Purpose-built vehicles are environmentally friendly means of transportation that can provide various services to passengers during their travel to a destination, and their usage may be expanded in various industries, such as public transportation, logistics, and autonomous taxis.

In line with recent trends, to meet various needs and provide passengers with three-dimensional space, there is a demand for solutions that allow passengers on purpose-built vehicle to freely use media contents, rather than simply providing entertainment services within the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an in-vehicle video system and control method thereof which is configured for three-dimensional space transitions by configuring a transfer unit sliding in the frontward and rearward direction or the left and right direction within the interior of the vehicle which is lined with display screens.

The technical objects of the present disclosure are not limited to the aforesaid, and other objects not described herein with be clearly understood by those skilled in the art from the descriptions below.

To solve the above problems, various aspects of the present disclosure are directed to providing an in-vehicle video system that includes a display provided on an internal surface of a vehicle and is configured to display a screen by receiving a video signal, a transfer unit provided on an internal side of the display with respect to the vehicle and configured to slide along a fixing member fixed to a floor of the vehicle on a frontward and rearward direction or a left and right direction of the vehicle within the vehicle, and a controller configured to determine a movement direction and a movement position of the transfer unit sliding in the frontward and rearward direction or the left and right direction and control the display and the transfer unit to transition the screen of the display in accordance with a movement path of the transfer unit based on the movement direction and the movement position of the transfer unit.

For example, the transfer unit may be formed in an annular shape with an open bottom portion.

For example, the transfer unit may be formed to have internal space situating a roller unit disposed in the width direction of the vehicle.

For example, the roller unit may be configured to be stored in the internal space or withdrawn downward.

For example, the fixing member may be disposed at the bottom portion of the transfer unit and includes a motor providing a driving force for the transfer unit to slide in the frontward and rearward direction or the left and right direction within the vehicle.

For example, the transfer unit may be configured to be divided into two portions, which may be slidable in the frontward and rearward direction or the left and right direction within the vehicle, respectively.

For example, the controller may be configured to determine a sliding starting point based on the movement position of the transfer unit and determine whether to divide the transfer unit based on the determined sliding start point.

For example, the controller may be configured to transition the screen displayed by the display in accordance with the movement path of each of the portions of the transfer unit.

For example, the controller may be configured to transition the screen of the display to be displayed on a side of the vehicle.

For example, the controller may be configured to rotate a vehicle seat to face the side onto which the screen is transitioned along with transitioning the screen of the display.

For example, the controller may be configured to determine the amount of movement of the transfer unit based on the movement direction and the movement position of the transfer unit and determine the movement path of the transfer unit based on the amount of movement of the transfer unit.

For example, the controller may be configured to control the transfer unit to stop sliding in the frontward and rearward direction or the left and right direction within the vehicle based on the amount of movement of the transfer unit.

To solve the above problems, various aspects of the present disclosure are directed to providing a video control method of a vehicle including a display provided on an internal surface of the vehicle to display a screen by receiving a video signal, the method including sliding a transfer unit in the frontward and rearward direction or the left and right direction along a fixing member fixed on a vehicle floor, determining movement direction and movement position of the transfer unit in response to the transfer unit sliding in the frontward and rearward direction or the left and right direction within the vehicle, and transitioning a screen displayed by the display in accordance with a movement path of the transfer unit based on the movement direction and the movement position of the transfer unit.

For example, the video control method may further include determining a sliding starting point based on the movement position of the transfer unit and determining whether to divide the transfer unit based on the determined sliding starting point.

For example, the video control method may further include determining the amount of movement of the transfer unit based on the movement direction and the movement position of the transfer unit and determining the movement path of the transfer unit based on the amount of movement of the transfer unit.

The in-vehicle video system and control method thereof according to an exemplary embodiment of the present disclosure is configured for three-dimensional space transitions by configuring a transfer unit sliding in the frontward and rearward direction or the left and right direction within the interior of the vehicle which is lined with display screens.

Furthermore, by providing various video information to passengers through a display, it is possible to maximize the utilization of the internal space of the vehicle.

The advantages of the present disclosure are not limited to the aforesaid, and other advantages not described herein may be clearly understood by those skilled in the art from the descriptions below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a diagram illustrating an in-vehicle video system according to various exemplary embodiments of the present disclosure;

Figure 2:
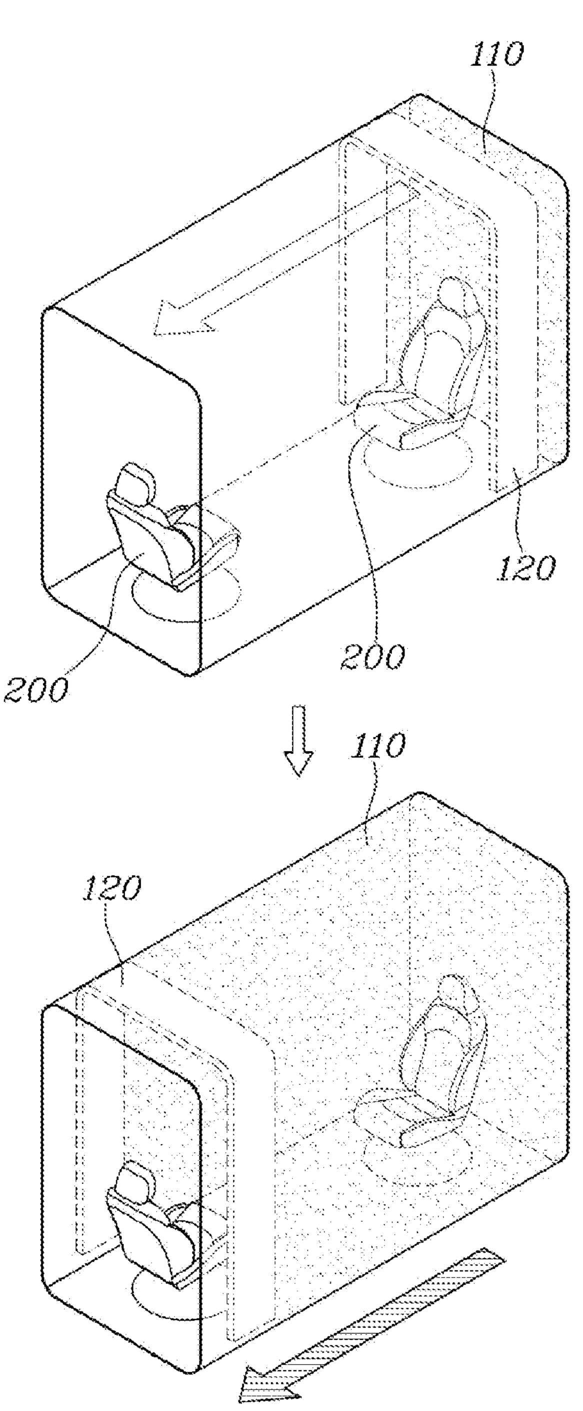
FIG. 2 is a diagram illustrating a transfer unit sliding frontward and rearward or left and right in a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, descriptions include the exemplary embodiments included in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, including no distinct meaning or role.

Furthermore, detailed descriptions of well-known technologies related to the exemplary embodiments included in the present specification may be omitted to avoid obscuring the subject matter of the exemplary embodiments included in the present specification. Furthermore, the accompanying drawings are only for easy understanding of the exemplary embodiments included in the present specification and do not limit the technical spirit included herein, and it should be understood that the exemplary embodiments include all changes, equivalents, and substitutes within the spirit and scope of the present disclosure. As used herein, terms including an ordinal number such as "first" and "second" may be used to describe various components without limiting the components. The terms are used only for distinguishing one component from another component.

It will be understood that when a component is referred to as being "connected to" or "coupled to" another component, it may be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

A controller may include a communication device communicating with another controller or sensor to control a function in charge, a memory that stores operating system or logic instructions and input/output information, and one or more processors for determination, operation, and decision-making necessary for functions in charge.

According to various exemplary embodiments of the present disclosure, it is provided to implement a transition of three-dimensional space by configuring the transfer unit to slide frontward and rearward or left and right in a structure applying a display screen to a vehicle.

Figure 1:
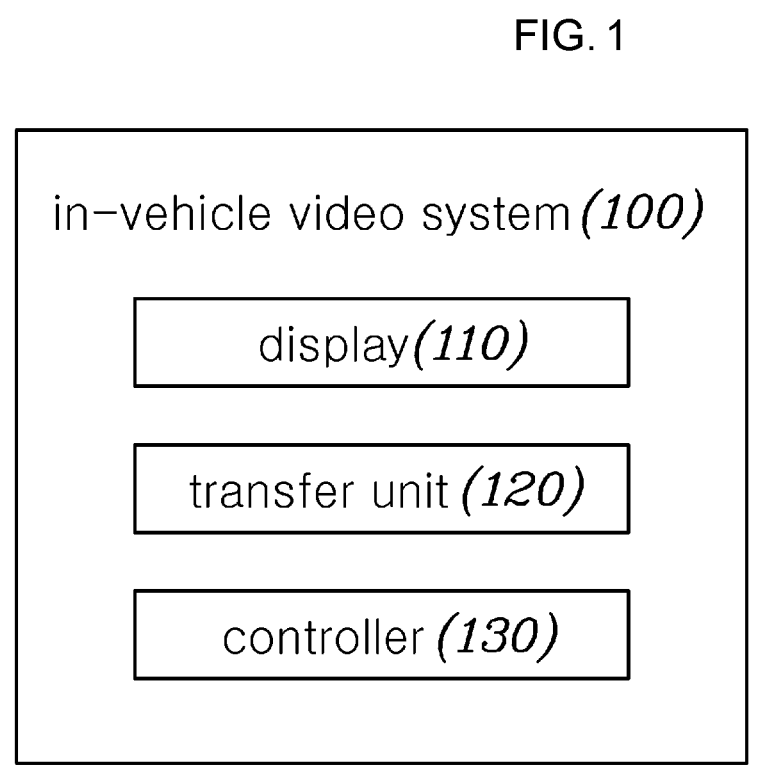

FIG. 1 is a diagram illustrating an in-vehicle video system according to various exemplary embodiments of the present disclosure. FIG. 1 shows components related to the exemplary embodiment and it is obvious that the actual implementation of the in-vehicle video system may include fewer or more components than this.

With reference to FIG. 1, an in-vehicle video system 100 according to various exemplary embodiments of the present disclosure may include a display 110, a transfer unit 120, and a controller 130.

First, the display 110 is provided on the internal surface of the glass panels provided on the roof and on the front, rear, left and right sides of the vehicle, and it may be configured in a display format. The display 110 may receive video signals to display a screen, allowing passengers in the vehicle to use media content. Here, the video signals may include both photo signals and video signals which may be received from the outside. Furthermore, the display 110 may perform a display function that provides basic vehicle information such as speed, time, vehicle status, power consumption, and indoor temperature, as well as basic app information for the vehicle such as maps, phone, music, video, games, shopping, and Internet.

Hereinafter, a description includes the transfer unit 120 that implements the three-dimensional space transitions.

The transfer unit 120 may be slidable frontward and rearward or left and right within the vehicle and may be embodied in two sliding methods. Descriptions are made of two embodiments with reference to FIG. 2 and FIG. 3.

Figure 3:
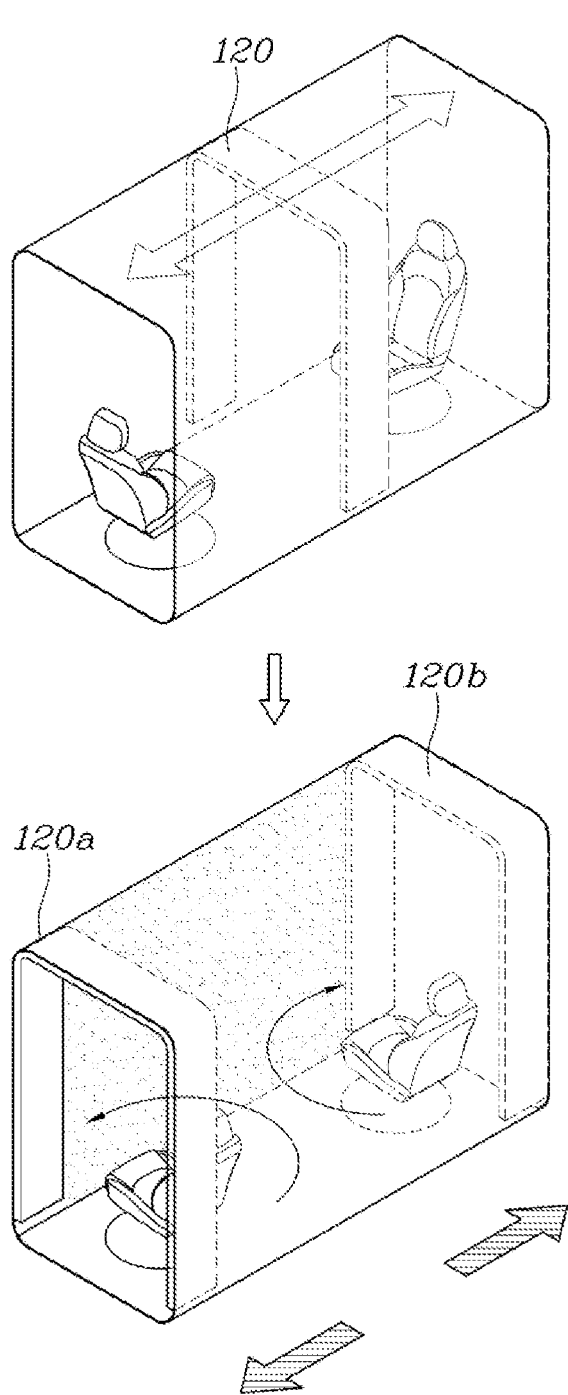
FIG. 3 is a diagram illustrating a transfer unit divided into two portions each sliding frontward and rearward or left and right in a vehicle according to various exemplary embodiments of the present disclosure.

FIG. 2 is a diagram illustrating a transfer unit 120 sliding frontward and rearward or left and right in a vehicle according to various exemplary embodiments of the present disclosure. FIG. 3 is a diagram illustrating a transfer unit 120 divided into two portions each sliding frontward and rearward or left and right in a vehicle according to various exemplary embodiments of the present disclosure.

With reference to FIG. 2 illustrating the various exemplary embodiments of the present disclosure, the transfer unit 120 is disposed to be movable along the internal surface of the display 110 with respect to the vehicle so that passengers may slide it frontward and rearward or left and right within the internal space of the vehicle. The transfer unit 120, under the control of the controller 130 to be described later, may implement a transition of space through the extension of display space in line with the traveling of the transfer unit 120 from an end portion of the internal space of the vehicle and through screen transitions of the display 110, allowing for the implementation of three-dimensional space transitions of contents. Furthermore, the transfer unit 120 may be formed in an annular shape with the lower portion opened to be slidable frontward and rearward or left and right within the vehicle in a state in contact with the internal surface of the display 110. Furthermore, the transfer unit 120 is provided with speakers overall, so most of the audio system are also available, allowing passengers to generate a more realistic implementation of three-dimensional space transitions.

With reference to FIG. 3 illustrating the various exemplary embodiments of the present disclosure, the transfer unit 120 may be configured to be divided into two portions. The two divided portions of the transfer unit 120 may slide frontward and rearward or left and right in the vehicle toward opposite end portions of the vehicle. The transfer unit 120 may be configured to be divided into two portions when the transfer unit 120 is placed at the center, allowing for a transition effect where the video on the display appears to spread from the center portion to the end portions. In the instant case, vehicle seats 200 to be described later may be rotated in the direction of the screen transition, maximizing the utilization of the indoor space of the vehicle.

Figure 4:
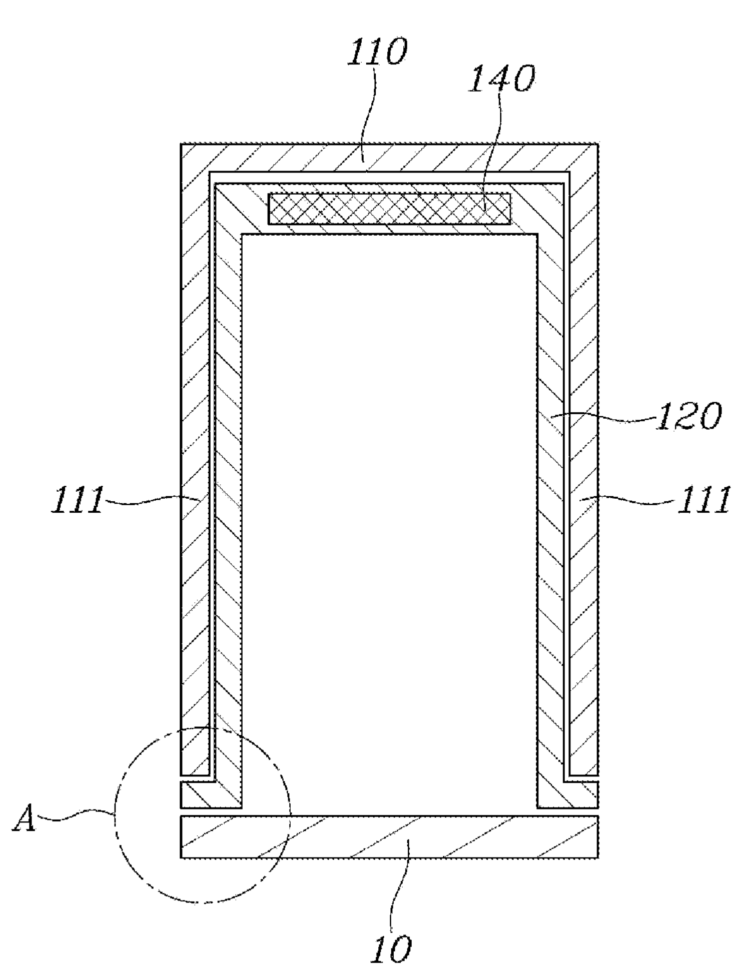
FIG. 4 is a cross-sectional view of the in-vehicle video system according to various exemplary embodiments of the present disclosure.

FIG. 4 is a cross-sectional view of the in-vehicle video system 100 according to various exemplary embodiments of the present disclosure.

With reference to FIG. 4, the inside of the transfer unit 120 may include an internal space formed to accommodate a roller unit 140. The roller unit 140 may be disposed in the width direction of the vehicle and extracted downwards in a rollable form. The roller unit 140 may include a display collapsible or extendible as needed, allowing the aspect ratio of the screen to be adjusted to match the content selected by the passenger.

Furthermore, when the passenger is not using the display, the display may be rolled up to be stored inside the internal space, maximizing the space utilization.

Furthermore, there may be an air duct inside the transfer unit 120 that is configured to control the heating, ventilation, and air conditioning of the vehicle, allowing for quick optimization of the air condition inside the vehicle.

Figure 5:
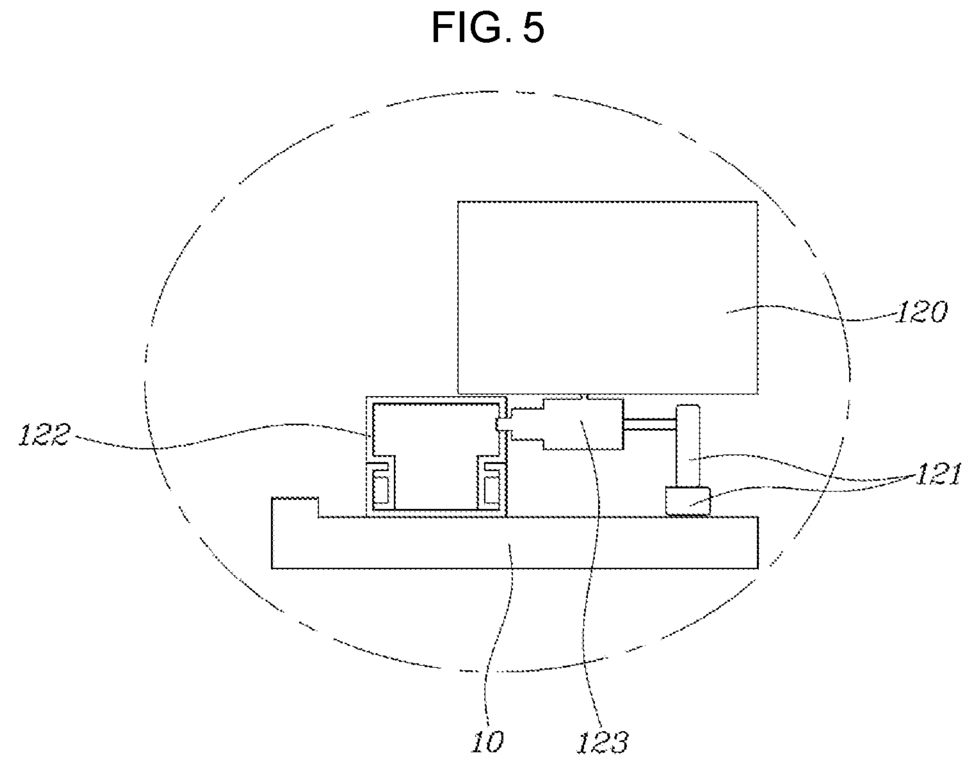
FIG. 5 is an enlarged view of area A in FIG. 4 according to various exemplary embodiments of the present disclosure.

FIG. 5 is an enlarged view of area A at the bottom portion of both sides 111 of the display in FIG. 4 according to various exemplary embodiments of the present disclosure.

With reference to FIG. 5, the transfer unit 120 may slide frontward and rearward or left and right along the fixing member 122 of the vehicle. In more detail, the transfer of the transfer unit 120 may be accomplished via a guide transfer device mounted on the floor 10. The guide transfer device may include a rack and pinion 121, a fixing member 122, and a motor 123. The rack and pinion 121 includes a rack and a pinion and may operate to convert rotation motion to linear motion. Furthermore, the motor 123 may provide the driving force for the transfer unit 120 to slide frontward and rearward or left and right inside the vehicle. The rack and pinion 121 is linked to the motor 123, when activated, to rotate the pinion, which, in turn, drives the rack linearly. Furthermore, the fixing member 122 may be configured as a rail structure at the bottom portion of the transfer unit 120 to be fixed to the vehicle floor 10.

Hereinafter, a description includes the controller 130 in detail.

The controller 130 may be configured to determine the movement direction and position of the transfer unit 120 when it slides frontward and rearward or left and right inside the vehicle. The controller 130 may be configured for controlling the display 110 to perform transition of the screen based on the determined movement direction and position of the transfer unit 120 and in line with the movement path of the transfer unit 120, resulting in a smooth and natural transition of the three-dimensional space as the transfer unit 120 moves. In more detail, the controller 130 may be configured for controlling the display 110 by detecting the movement direction (frontward and rearward or left or right) and the current position of the transfer unit 120 within the vehicle and determining the activation area of the vehicle's side glass display accordingly.

Meanwhile, in the various exemplary embodiments where the transfer unit 120 is divided, the controller 130 may be configured to determine the sliding starting point based on the movement position of the transfer unit 120. The sliding starting point may refer to the starting point where the transfer unit 120 is located at the center portion of the vehicle. The controller 130 may locate the current position of the transfer unit 120 and determine whether to divide the transfer unit 120 when it slides frontward and rearward or left and right and reaches the center. The controller 130 may be configured for controlling the transfer unit 120 to move as a whole without being divided when the transfer unit 120 is not divided.

Furthermore, when the transfer unit 120 is divided and each transfer unit 120 slides frontward and rearward or left and right in the vehicle, the controller 130 may be configured for controlling the display 110 to transition the displayed screen in accordance with the movement path of each transfer unit 120. In the instant case, the controller 130 may increase the screen concentration effect of the passengers by controlling the display 110 to transition the screen only on one side of the vehicle.

The controller 130 may be configured to determine the amount of movement of the transfer unit 120 based on the movement direction and position of the transfer unit 120. This allows the controller 130 to determine the movement path of the transfer unit 120, and in the instant case, the controller 130 may be configured to determine the amount of movement of the transfer unit 120 based on its movement direction and position and control the display 110 to transition the screen corresponding to the distance the transfer unit 120 has slid rearward or frontward from the front or rear of the vehicle. When the transfer unit 120 reaches the center portion and includes two portions, it is possible to determine the amount of movement of each portion of the transfer unit 120 as they move from the center portion to the opposite end portions and control the display 110 to transition the screen in accordance with the distance the transfer unit 120 has slid to generate a transition effect where the image on the display appears to expand from the center portion to the opposite end portions. In the instant case, the controller 130 may be configured for controlling the display 110 to transition the screen only on one side of the vehicle, and rotate the vehicle seat 200 in the direction of the screen transition, maximizing the use of the internal space of the vehicle.

Furthermore, the controller 130 may stop the transfer unit 120 from sliding frontward and rearward or left and right based on the amount of movement of the transfer unit 120. This is intended to maintain a three-dimensional space implemented with the screen by stopping the sliding of the transfer unit 120 when the transfer unit 120 reaches the end portion or when the divided transfer units 120*a* and 120*b* reach their respective opposite end portions from the center portion of the vehicle under the control of the controller 130.

A description includes the method for controlling an in-vehicle video system according to an exemplary embodiment will be described with reference to FIG. 6 and FIG. 7 based on the above-described in-vehicle video system 100.

Figure 6:
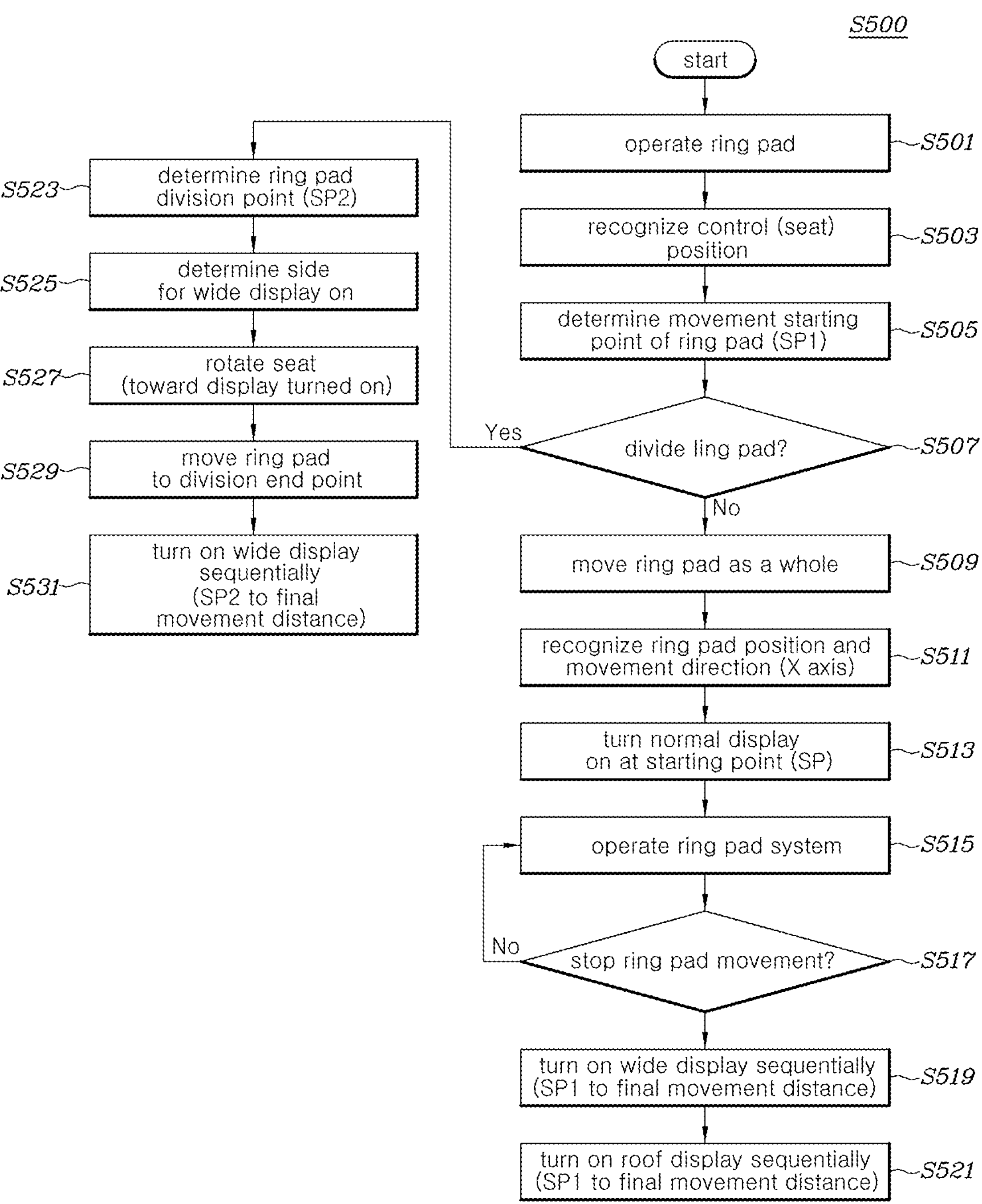
FIG. 6 is a flowchart illustrating a control method of an in-vehicle video system according to various exemplary embodiments of the present disclosure.

FIG. 6 is a flowchart illustrating the control method S500 of an in-vehicle video system according to various exemplary embodiments of the present disclosure. Prior to the description, it should be noted that the term "ring pad" used in the flowchart refers to the transfer unit 120.

With reference to FIG. 6, the in-vehicle video system 100 may start operation at step S501. The controller 130 may recognize the position of the vehicle seat 200 at step S503 and determine the sliding start point SP1 at step S505 based on the movement position of the transfer unit 120. The sliding starting point may refer to the starting point where the transfer unit 120 is located at the center portion of the vehicle. The controller 130 may locate the current position of the transfer unit 120 and determine at step S507 whether to divide the transfer unit 120 when it slides frontward and rearward or left and right and reaches the center. When it is determined to divide the transfer unit 120 (YES at step S507), the controller 130 may determine, at step S523, the sliding start point SP2 where the transfer unit 120 is divided. Next, the controller 130 may determine, at step S525, a side to be on as a wide display through screen transition. Simultaneously with the screen transition on one side, the vehicle seat 200 may rotate at step S527. Once each divided portion of the transfer unit 120 has slid to the end portion of the vehicle at step S529, the controller 130 may be configured for controlling the display 110 to sequentially turn on the screen, at step S531, in accordance with the movement path of the transfer unit 120 to cover the wide display.

When it is determined to not divide the transfer unit (NO at step S507), the controller 130 may be configured for controlling the transfer unit 120 to move, at step S509, as a whole without being divided. Next, the controller 130 may recognize the movement direction and position of the transfer unit 120 in the x-axis, at step S511. Next, the controller 130 may be configured for controlling the display 110 to transition the screen at step S513. Here, the normal display means the display 110 provided on the internal surface of the vehicle.

Next, the transfer unit 120 may slide frontward and rearward or left and right at step S515, and then the controller 130 may be configured to determine at step S517 whether to stop the transfer unit 120 from sliding based on the amount of movement of the transfer unit 120. When it is determined to stop the transfer unit 120 from sliding (YES at step S517), the controller 130 may be configured for controlling the display 110 to sequentially turn on the screen from the wide display to the roof display in accordance with the movement path of the transfer unit 120 at steps S519 and S521.

Figure 7:
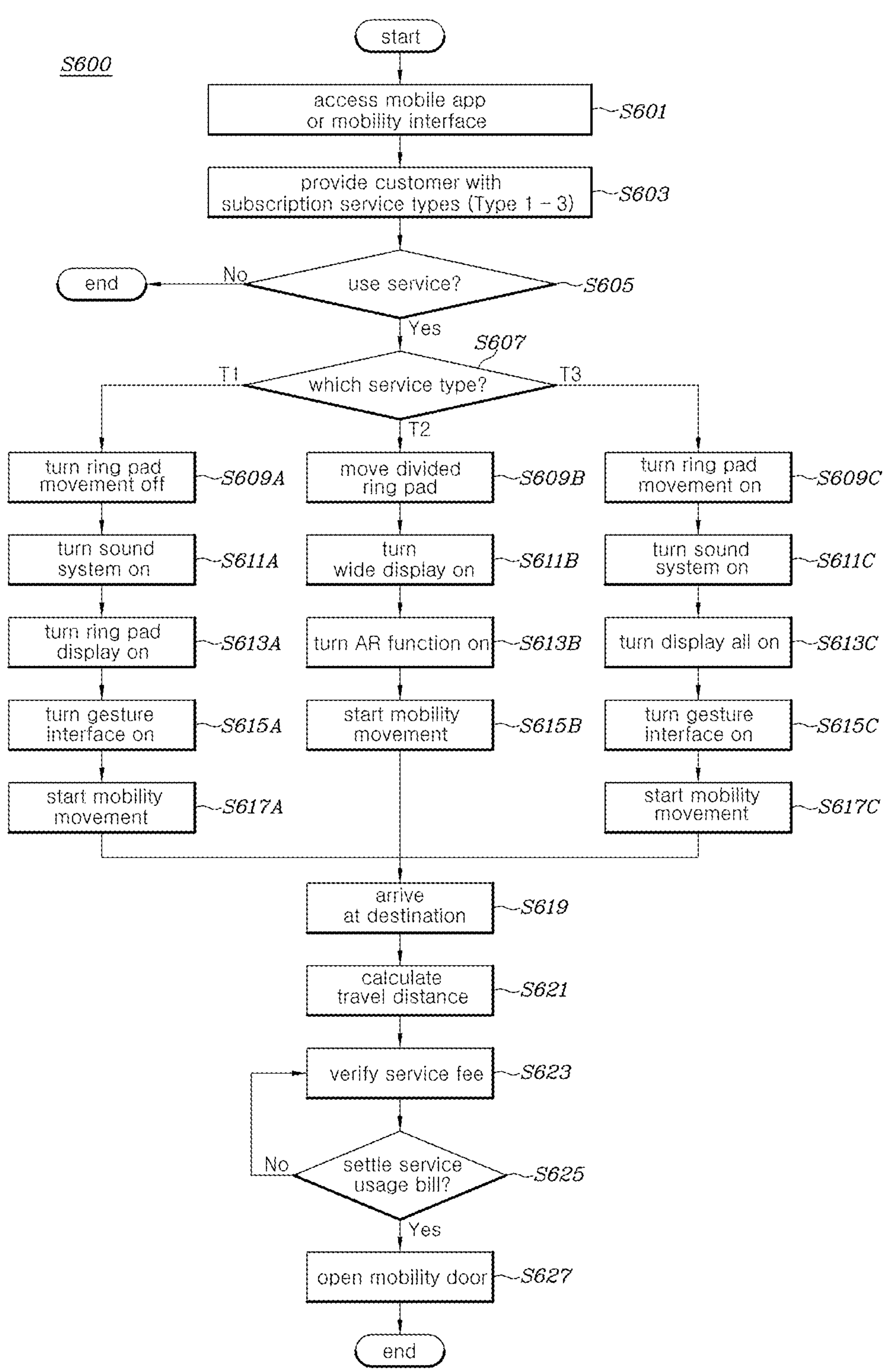
FIG. 7 is a flowchart a method for controlling a display among a control method of an in-vehicle video system according to various exemplary embodiments of the present disclosure.

FIG. 7 is a flowchart illustrating a method for controlling the display 110 among the control method S600 of an in-vehicle video system according to various exemplary embodiments of the present disclosure.

With reference to FIG. 7, a flowchart is provided in association with the subscriber's service selection. First, a passenger may access a mobile app or an in-vehicle interface at step S601. Through the mobile app or interface, the passenger (customer) may be guided on the subscription service types at step S603. For example, Type 1 is a real-time live streaming subscription mobility service. To achieve this, high-quality audio, display, lighting, and gesture control functionality are necessary. Type 2 is an augmented reality (AR) video matching mobility service using location information (AR-extended navigation service). To achieve this, AR display functionality centered around the service is necessary. Type 3 is a mobility content service integrating mobile spaces and virtual environments (mobility-based performances, game services). To achieve this, rollable display functionality, high-quality audio, and wide display capability are necessary. Although the service types are classified into three categories as an exemplary embodiment of the present disclosure, it is not necessarily limited to only three types of services.

Next, the controller 130 may then inform the customer of the subscription service type (S605).

Next, the controller 130 may be configured to determine at step S607 whether the customer has selected a subscription service type. Depending on whether the customer's subscription service type is Type 1, Type 2, or Type 3, the display 110 and control method of the controller 130 may vary. First, in the case of Type 1, the controller 130 may stop the sliding of the transfer unit 120 at step S609A and control the audio system to be on at step S611A. Next, after controlling a display provided on the transfer unit 120 to be on at step S613A, it may be possible to control, at step S615A, to turn on an interface recognized via the customer's gesture. Afterward, the vehicle starts to move at S617A.

Second, in the case of Type 2, the transfer unit 120 may be divided into two portions to be moved at step S609B. The controller 130 may be configured for controlling the screen transition in accordance with the movement path of the divided transfer unit 120 at step S611B. Next, the controller 130 may be configured for controlling the AR display function to be on at step S613B, and then the vehicle starts to move at step S615B.

Third, in the case of Type 3, the controller 130 may be configured for controlling the transfer unit 120 to slide at step S609C. Next, the controller 130 may be configured for controlling the audio system to be on at step S611C. Next, the controller 130 may be configured for controlling all displays to be on at step S613C and then control an interface recognized via the customer's gesture to be on at step S615C. Afterward, the vehicle starts to move at S617C.

When the vehicle arrives at its destination at step S619, the controller 130 may determine, at step S621, the total distance traveled by the vehicle while the passenger is on board. The controller 130 may verify, at step S623, the service fee based on the determined total distance traveled by the vehicle and determine at step S625 whether to settle the customer's usage bill. Once the usage bill settlement is completed (YES at step S625), the controller 130 may be configured for controlling the vehicle doors to be opened at step S627.

According to the above-described embodiments of the present disclosure, the in-vehicle video system and control method thereof according to an exemplary embodiment of the present disclosure is configured for three-dimensional space transitions by configuring a transfer unit sliding frontward and rearward or left and right within the interior of the vehicle which is lined with display screens. Furthermore, by providing various video information to passengers through a display, it is possible to maximize the utilization of the internal space of the vehicle.

The vehicle and an acceleration limit control method thereof according to an exemplary embodiment of the present disclosure is advantageous in terms of providing a smooth feeling of acceleration and enabling the driver to enjoy more improved driving in such a way of determining the driving score hang amount based on the driver's driving behavior and changing the acceleration limit level based on the current driving score.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An in-vehicle video system comprising:

a display provided on an internal surface of a vehicle and configured to display a screen by receiving a video signal;

a transfer unit provided on an internal side of the display with respect to the vehicle and configured to slide along a fixing member fixed to a floor of the vehicle on a frontward and rearward direction or a left and right direction of the vehicle within the vehicle; and a controller configured to determine a movement direction and a movement position of the transfer unit sliding in the frontward and rearward direction or the left and right direction and control the display and the transfer unit to transition the screen of the display in accordance with a movement path of the transfer unit based on the movement direction and the movement position of the transfer unit, wherein the controller is configured to determine a sliding starting point based on the movement position of the transfer unit.

2. The in-vehicle video system of claim 1, wherein the transfer unit is formed in an annular shape with an open bottom portion.

3. The in-vehicle video system of claim 1, wherein the transfer unit includes an internal space in which a roller unit is mounted in a width direction of the vehicle.

4. The in-vehicle video system of claim 3, wherein the roller unit is configured to be stored in the internal space or withdrawn downward.

5. The in-vehicle video system of claim 1, wherein the fixing member is disposed at a bottom portion of the transfer unit and includes a motor providing a driving force for the transfer unit to slide in the frontward and rearward direction or the left and right direction within the vehicle.

6. The in-vehicle video system of claim 1, wherein the transfer unit is configured to be divided into at least two portions, which are respectively slidable in the frontward and rearward direction or the left and right direction within the vehicle.

7. The in-vehicle video system of claim 6, wherein the controller is configured to determine whether to divide the transfer unit based on the determined sliding start point.

8. The in-vehicle video system of claim 7, wherein the controller is configured to transition the screen displayed by the display in accordance with the movement path of each of the at least two divided portions of the transfer unit.

9. The in-vehicle video system of claim 8, wherein, of based on concluding that the transfer unit is to be divided based on the determined sliding starting point, the controller is configured for:

sliding each of the at least two divided portions of the transfer unit to an end portion of the vehicle; and controlling the display to turn on the screen.

10. The in-vehicle video system of claim 6, wherein the controller is configured to transition the screen of the display to be displayed on a side of the vehicle.

11. The in-vehicle video system of claim 10, wherein the controller is configured to rotate a vehicle seat to face the side onto which the screen is transitioned along with transitioning the screen of the display.

12. The in-vehicle video system of claim 1, wherein the controller is configured to determine an amount of movement of the transfer unit based on the movement direction and the movement position of the transfer unit and determine the movement path of the transfer unit based on the amount of movement of the transfer unit.

13. The in-vehicle video system of claim 12, wherein the controller is configured to control the transfer unit to stop sliding in the frontward and rearward direction or the left and right direction within the vehicle based on the amount of movement of the transfer unit.

14. A video control method of a vehicle including a display provided on an internal surface of the vehicle to display a screen by receiving a video signal, the method comprising:

sliding, by a controller, a transfer unit in a frontward and rearward direction or a left and right direction along a fixing member fixed on a vehicle floor;

determining, by the controller, movement direction and movement position of the transfer unit in response to the transfer unit sliding in the frontward and rearward direction or the left and right direction within the vehicle;

transitioning, by the controller, the screen displayed by the display in accordance with a movement path of the transfer unit based on the movement direction and the movement position of the transfer unit; and determining, by the controller, a sliding starting point based on the movement position of the transfer unit.

15. The video control method of claim 14, further including:

determining, by the controller, whether to divide the transfer unit based on the determined sliding starting point.

16. The video control method of claim 15, further including:

determining, by the controller, amount of movement of the transfer unit based on the movement direction and the movement position of the transfer unit; and determining, by the controller, the movement path of the transfer unit based on the amount of movement of the transfer unit.

17. The video control method of claim 16, further including: in response of concluding that the transfer unit is to be divided based on the determined sliding starting point, sliding, by the controller, each divided portion of the transfer unit to an end portion of the vehicle; and controlling, by the controller, the display to turn on the screen.

18. The video control method of claim 17, wherein the controller is configured to control the transfer unit to stop sliding in the frontward and rearward direction or the left and right direction within the vehicle based on the amount of movement of the transfer unit.

19. A non-transitory computer readable storage medium on which a program for performing the video control method of claim 14 is recorded.

* * * * *